US007463136B2

United States Patent
Ungerman

(10) Patent No.: US 7,463,136 B2
(45) Date of Patent: Dec. 9, 2008

(54) TRAILER SAFETY SYSTEM

(76) Inventor: Don L. Ungerman, 260 W. 990 North, Orem, UT (US) 84057

( * ) Notice: Subject to any disclaimer, the term of this patent is extended or adjusted under 35 U.S.C. 154(b) by 206 days.

(21) Appl. No.: 11/403,150

(22) Filed: Apr. 11, 2006

(65) Prior Publication Data
US 2006/0255921 A1 Nov. 16, 2006

Related U.S. Application Data

(60) Provisional application No. 60/671,387, filed on Apr. 13, 2005.

(51) Int. Cl.
G08B 21/00 (2006.01)
(52) U.S. Cl. .................. 340/431; 340/468; 340/471
(58) Field of Classification Search ............ 340/431, 340/463, 468, 425.5, 438, 471, 472, 47
See application file for complete search history.

(56) References Cited

U.S. PATENT DOCUMENTS

| 2,046,976 | A | * | 7/1936 | Sorensen | ............... 315/77 |
| 3,062,326 | A | * | 11/1962 | Jones et al. | ............... 188/3 R |
| 4,005,313 | A | | 1/1977 | Tibbits | |
| 4,017,827 | A | * | 4/1977 | Brodesser | ............... 340/431 |
| 4,142,172 | A | | 2/1979 | Menard | |
| 4,368,455 | A | | 1/1983 | Menard | |
| 4,385,771 | A | | 5/1983 | Eckels | |
| 4,395,696 | A | | 7/1983 | Menard | |
| 4,781,393 | A | | 11/1988 | Jeter | |
| 4,859,982 | A | | 8/1989 | Seaburg | |
| 4,903,174 | A | | 2/1990 | Busby | |
| 5,150,284 | A | | 9/1992 | Dobert | |
| 5,719,552 | A | | 2/1998 | Thompson | |
| 6,166,516 | A | * | 12/2000 | Albright et al. | ............... 320/104 |
| 6,217,200 | B1 | | 4/2001 | Huffman | |
| 2002/0038974 | A1 | * | 4/2002 | Lamke et al. | ............... 303/7 |
| 2005/0258947 | A1 | | 11/2005 | Kunianski | |
| 2006/0001529 | A1 | | 1/2006 | Young | |

FOREIGN PATENT DOCUMENTS

DE 4204856 8/1993
DE 010342785 A1 * 3/2005

* cited by examiner

Primary Examiner—Brent Swarthout
(74) Attorney, Agent, or Firm—Clayton, Howarth & Cannon, P.C.

(57) ABSTRACT

A system for providing emergency lighting for a trailer by way of retrofit or original manufacture. The system may include a battery and an intermittent flasher controlled by one or more switches. The system may include a break-away switch operable to activate both the trailer braking system and emergency lights in the event that the trailer becomes disconnected from the vehicle. The system may also include a switch for manual activation. Another embodiment may include a module attachable to a plug of a trailer electrical system. When attached, the module activates emergency lighting on the trailer.

16 Claims, 3 Drawing Sheets

US 7,463,136 B2

TRAILER SAFETY SYSTEM

CROSS-REFERENCE TO RELATED APPLICATIONS

This application claims the benefit of U.S. Provisional Application No. 60/671,387, filed Apr. 13, 2006, entitled "Trailer Safety System," which is hereby incorporated by reference herein in its entirety, including but not limited to those portions that specifically appear hereinafter, the incorporation by reference being made with the following exception: In the event that any portion of the above-referenced application is inconsistent with this application, this application supercedes said above-referenced application.

STATEMENT REGARDING FEDERALLY SPONSORED RESEARCH OR DEVELOPMENT

Not Applicable.

BACKGROUND OF THE INVENTION

1. The Field of the Invention

The present invention relates generally to trailer safety systems, and more particularly, but not necessarily entirely, to emergency lighting systems for trailers.

2. Description of Related Art

Most trailers towed by a motor vehicle are required to have a trailer lighting system. The trailer lighting system may typically comprise brake lights, a left and a right turn signal, backup lights and tow marker lights. The trailer lighting system is normally coupled to and controlled by the vehicle lighting system such that the trailer lighting system mimics the operation of the vehicle lighting system. For example, when a turn signal on the vehicle is activated, the corresponding trailer turn signal is also activated. In addition, when the hazard or flasher lights are activated on the vehicle, the trailer lights will also flash or blink.

Trailer lighting systems are connected to vehicle lighting system by an umbilical cord having a connector or plug mounted on its free end. The connector or plug on the end of the umbilical cord may be inserted into a corresponding connector or socket on the vehicle. The connector or socket on the vehicle may be hard wired into the vehicle lighting system. There are known several different types of connectors in the prior art. These include, without limitation, 7-way, 6-way, and 4-way connectors of different configurations, e.g. round or flat.

One problem that arises in the prior art is that when the trailer lighting system is uncoupled from the tow vehicle, the trailer lighting system ceases to be operational. Normally, this is not a problem. However, in an emergency situation, it may be desirable to have the trailer lighting system continue to operate to alert drivers of a potential hazard. For example, trailers often become disabled and must be left parked along the side of a busy highway. Normally, without a connection to the tow vehicle, the trailer lights cannot be operated leaving a potential danger to other drivers, especially at night.

Some state and federal laws may require that utility or cargo trailers being used for commercial gain or having a 10,000 pound or more cargo capacity, be equipped with onboard safety equipment such as an operable breakaway system that requires that the trailer be equipped with a 12 volt battery.

The features and advantages of the invention will be set forth in the description which follows, and in part will be apparent from the description, or may be learned by the practice of the invention without undue experimentation. The features and advantages of the invention may be realized and obtained by means of the instruments and combinations particularly pointed out in the appended claims.

BRIEF DESCRIPTION OF THE DRAWINGS

The features and advantages of the invention will become apparent from a consideration of the subsequent detailed description presented in connection with the accompanying drawings in which.

DETAILED DESCRIPTION

Figure 1:
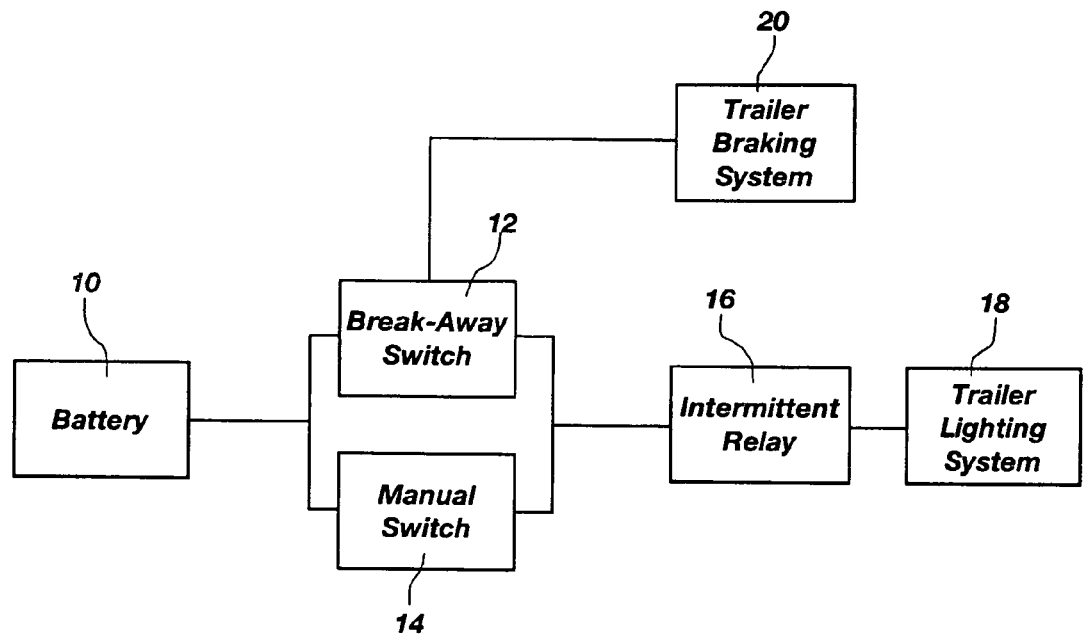
FIG. 1 is a block diagram showing one exemplary embodiment of the present invention.

For the purposes of promoting an understanding of the principles in accordance with the invention, reference will now be made to the exemplary embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

The publications and other reference materials referred to herein to describe the background of the invention, and to provide additional detail regarding its practice, are hereby incorporated by reference herein in their entireties, with the following exception: In the event that any portion of said reference materials is inconsistent with this application, this application supercedes said reference materials. The reference materials discussed herein are provided solely for their disclosure prior to the filing date of the present application. Nothing herein is to be construed as a suggestion or admission that the inventor is not entitled to antedate such disclosure by virtue of prior invention, or to distinguish the present invention from the subject matter disclosed in the reference materials.

It must be noted that, as used in this specification and the appended claims, the singular forms "a," "an," and "the" include plural referents unless the context clearly dictates otherwise. In describing and claiming the present invention, the following terminology will be used in accordance with the definitions set out below. As used herein, the terms "comprising," "including," "containing," "characterized by," and grammatical equivalents thereof are inclusive or open-ended terms that do not exclude additional, unrecited elements or method steps.

Applicant has discovered an apparatus, system and method for allowing a trailer that is not connected to a tow vehicle to have a functioning lighting system, especially in emergency situations. One aspect of applicant's invention includes retrofitting an existing trailer's wiring system with the present invention to thereby provide emergency lighting independent of a tow vehicles lighting system. Another aspect of the present invention may include a temporary adjustment to a trailer's wiring system to thereby provide emergency lighting. It is another aspect of the present invention to provide a trailer lighting system capable of providing emergency lighting independent of a tow vehicle's lighting system.

Referring now to FIG. 1, there is shown a block diagram of one exemplary embodiment of the present invention for providing emergency lighting to a trailer, which includes a battery 10, a break-away switch 12, a manual switch 14, an intermittent relay 16, a trailer lighting system 18 and a trailer breaking system 20. The battery 10 may be part of a trailer's own electrical system or may be separately installed depending upon the type of trailer being used. It should be understood that battery 10 may not be part of a tow vehicle's electrical system, since such a configuration would not allow the trailer to be disconnected from the tow vehicle without losing power.

The break-away switch 12 may be employed to both activate the trailer breaking system as well as activating the trailer lighting system. The break-away switch 12 may be of conventional design and typically includes a lanyard anchored to the tow vehicle or other anchoring point such that when the trailer accidently becomes uncoupled from the tow vehicle, the lanyard is yanked to thereby turn ON break-away switch 12. The activation of break-away switch 12 may simultaneous engage the trailer's braking system 20 and activate the trailer's lighting system 18 as an emergency indicator that an accidental uncoupling has occurred. A manual switch 14 may also be employed to allow manual activation of the trailer lighting system 18 independent of the break-away switch. This may allow, for example, the trailer to be uncoupled from the tow vehicle and the brake lights activated to thereby become emergency flashing lights on the trailer.

An intermittent relay 16 may also be connected to the trailer lighting system. The intermittent relay 16 is operable to flash or blink the lights of the trailer lighting system. It will be understood and appreciated that the intermittent relay 18 may be connected to the left and right turn signals of the trailer lighting system 18. The intermittent relay 16 may also be connected to the trailer lighting system 18, which may include tow marker lights. It will be appreciated that the term "tow marker lights" as used herein means tow marker lights, park lights and/or running lights.

Figure 2:
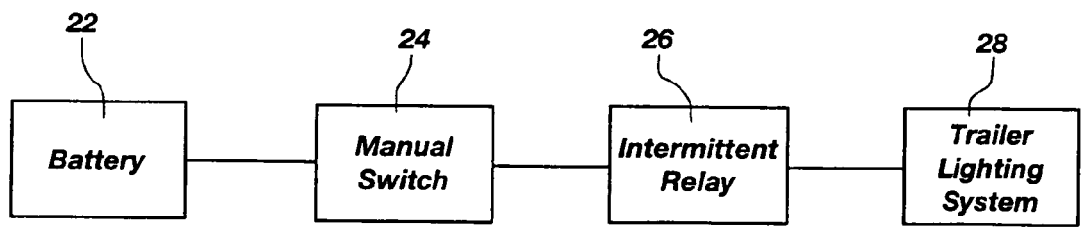
FIG. 2 is another block diagram showing another exemplary embodiment of the present invention.

FIG. 2 illustrates a block diagram of another embodiment of the present invention. In FIG. 2, a battery 22 supplies power to trailer brake lights 28 and tow marker lights 29. Again, the battery 22 may not be part of a tow vehicle's electrical system but an on board the trailer. An intermittent relay 26 is operable to flash or blink the brake lights 28 to thereby provide emergency lighting without relying on the tow vehicle's lighting system. The manual switch 24 may cause the tow marker lights 29 to flash in addition to the brake lights 28. The manual switch 24 is convenient since it allows a user to determine which lights on the trailer will flash or blink. For example, it may be desirable to only flash the brake lights 28 if the trailer is parked along the side of a highway. However, the manual switch 24 may allow the tow marker lights 29 to flash or blink as well to thereby function as a signal in a trailer park when someone is attempting to locate the trailer.

Figure 3:
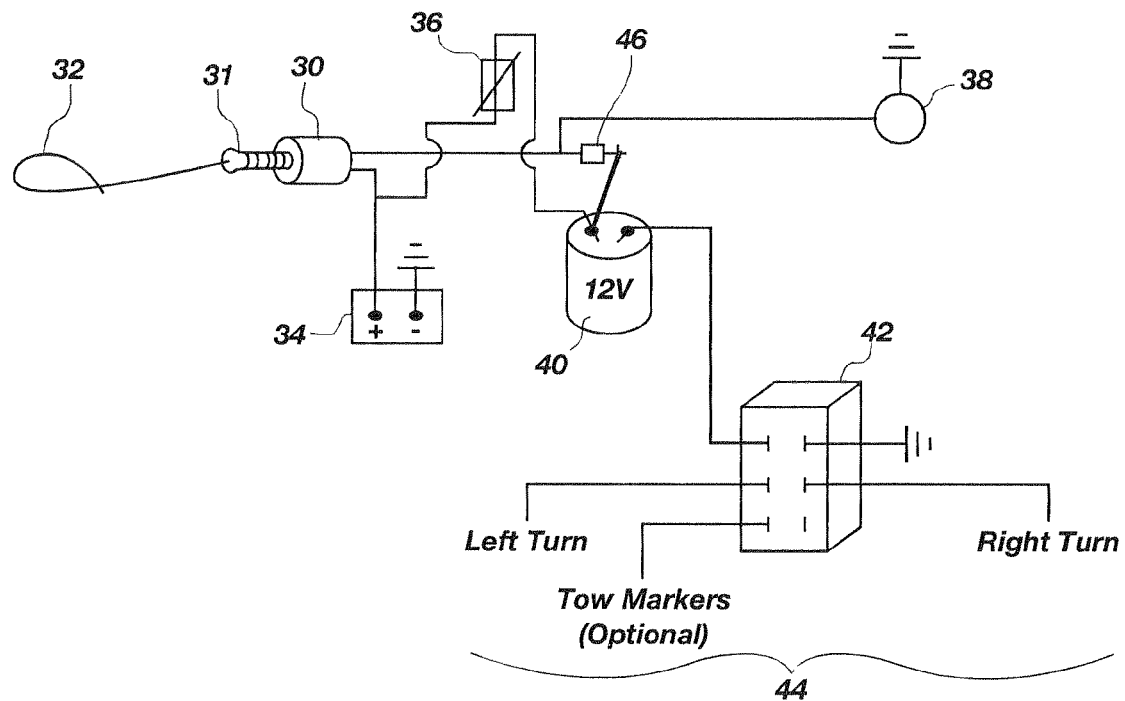
FIG. 3 is a schematic showing circuitry embodying still another embodiment of the present invention.

FIG. 3 illustrates a schematic of one embodiment of the present invention. A battery 34 supplies power for a trailer braking system 38 and a trailer lighting system 44. A break-away-switch 30 may be used to engage the trailer braking system 38 in the event of an emergency. Typically, the break-away-switch may include a control lever 31 attached to a lanyard 32. The opposite end of the lanyard 32 is attached to an anchor point (not shown) such that if the break-away-switch 30 becomes separated more than a predefined distance, the lanyard 32 operates to pull the control lever 31 to thereby activate the trailer braking system 38.

The break-away switch 30 may also be electrically connected to the trailer lighting system 44. In the event that the control lever 31 is pulled by lanyard 32, the break-away switch may also activate the trailer lighting system 44. Interconnected between the break-away switch 30 and the trailer lighting system 44 may be a flasher 40. The flasher 40 is operable to flash the lights of the trailer lighting system 44 when the break-away switch 30 has been triggered. A one way diode 46 may be used to prevent the trailer braking system from activating.

A manually operated switch 36 may also be operable to activate the trailer lighting system 44. The manually operated switch 36 interrupts a hot lead from the battery 34 to the flasher 40. The manually operated switch 36 may also be connected in series with flasher 40 such that when the switch 36 is activated, the flasher 40 is operable to flash or blink the lights of the trailer lighting system 44.

The net result of the above features in FIG. 3 is to provide a emergency lighting system that is activated upon either the break-away switch 30 being activated or the actuation of the manual switch 36. One difference however is that the lanyard 32 on the break-away switch activates both the trailer braking system 38 and the trailer lighting system 44.

In addition, a switch 45 may provide, in addition to the flashing brake lights, for flashing a trailer's tow marker lights. The switch 45 may be used to conserve battery power and the option of the user to flash either separately or in combination the brake lights and/or the tow marker lights.

Figure 4:
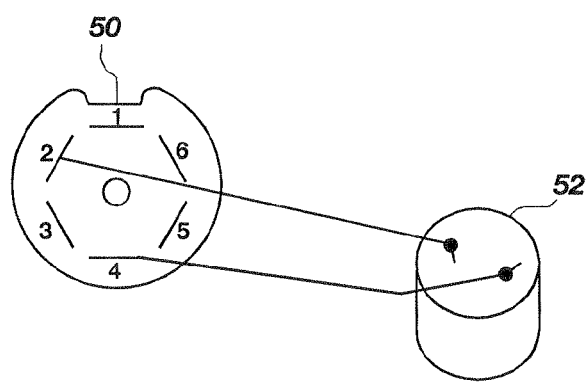
FIG. 4 is a diagram showing an exemplary embodiment of the present invention.

Referring now to FIG. 4 there is shown an independent flasher system for a conventional 7-way trailer plug 50 using a plug-in module 52. The 7-way trailer plug 50 includes seven (7) connectors numbered 1 through 7. The configuration of the 7-way trailer plug 50 is common throughout the industry and is shown in table format in Table 1 below.

TABLE 1

WIRING CODE FOR 7-WAY PLUG (TRAILER END)

| Number/Position | Color | Function |
| --- | --- | --- |
| 1 | White | Common Ground |
| 2 | Red | Left Turn |
| 3 | Green | Tail Light |
| 4 | Black | Battery Charge |
| 5 | Brown | Right Turn |
| 6 | Blue | Trailer Brakes |
| 7 | Yellow | Auxiliary/Back up |

It should be noted that the above wiring code may vary from plug to plug depending on the manufacturer of the tow vehicle.

The module 52 includes reciprocal connectors to connect connector 4 on the plug 50 to a lead of a flasher and connectors 2 and 5 to another lead of the flasher. When the module 52 is connected as described immediately above, the left and right turn signals will flash or blink as hazard or emergency lights.

In addition, a switch 51 may provide, in addition to the flashing brake lights, for flashing a trailer's tow marker lights. The switch 51 may be used to conserve battery power and the option of the user to flash either separately or in combination the brake lights and/or the tow marker lights.

Figure 5:
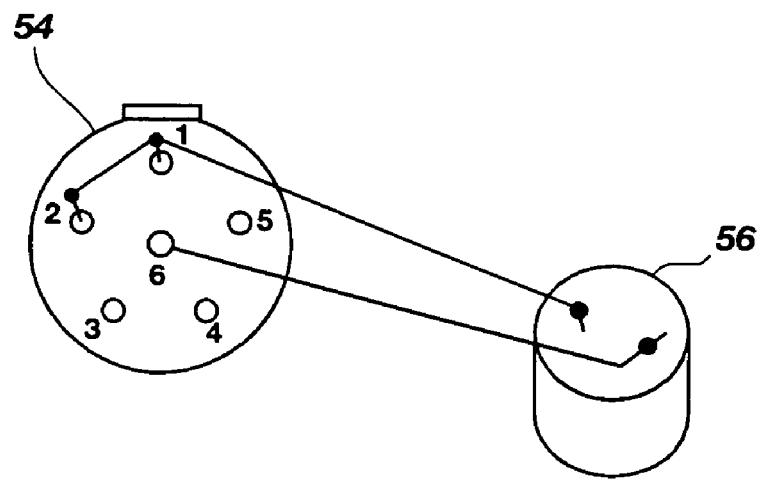
FIG. 5 is a diagram showing an exemplary embodiment of the present invention.

FIG. 5 is similar to FIG. 4, except that a 6-way plug 54 is shown instead of a 7-way plug 50. A common wiring configuration for the 6-way plug 54 is shown in Table 2 below.

TABLE 2

WIRING CODE FOR 6-WAY PLUG

| Number/Position | Function |
| --- | --- |
| 1 | Left Turn |
| 2 | Right Turn |
| 3 | "S" Stop |
| 4 | "T.M." Tow Marker/Clearance |
| 5 | Ground |
| 6 | "A" Alternator/Charge |

Again, actual wiring may vary depending on the manufacturer of the tow vehicle.

A module 56 includes reciprocal connectors to connect connector 6 on the plug 50 to a lead of a flasher and connectors 1 and 2 to another lead of the flasher. When the module 56 is connected as described immediately above, the left and right turn signals will flash or blink as hazard or emergency lights.

The modules 52 and 56 may attach directly to the end of plugs 50 and 54. The flashing or blinking will continue as long as the battery is able to supply power.

In addition, a switch 55 may provide, in addition to the flashing brake lights, for flashing a trailer's tow marker lights. The switch 55 may be used to conserve battery power and the option of the user to flash either separately or in combination the brake lights and/or the tow marker lights.

Figure 6:
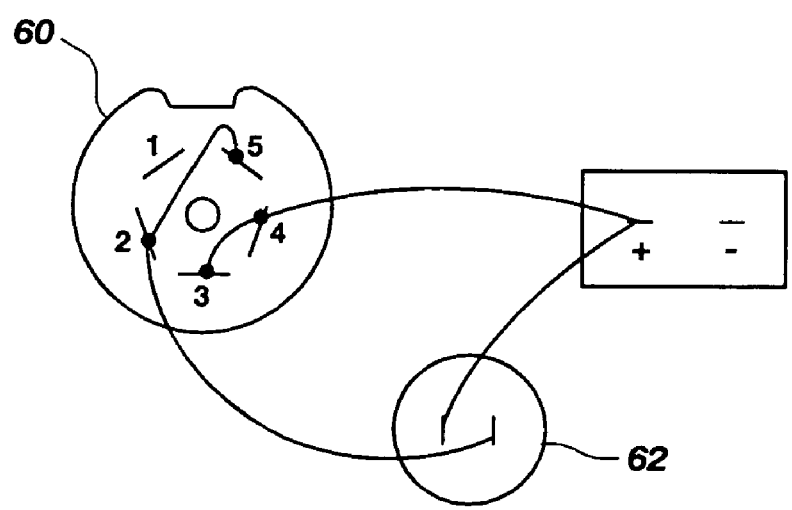
FIG. 6 is a diagram showing an exemplary embodiment of the present invention.

FIG. 6 is similar to FIGS. 4 and 5, except that a semi-trailer plug 60 is shown. A common wiring configuration for the semi-trailer plug 60 is shown in Table 3 below.

TABLE 3

WIRING CODE FOR SEMI-TRAILER PLUG

| Number | Function |
| --- | --- |
| 1 | Ground |
| 2 | Left Turn |
| 3 | Tail Light |
| 4 | Battery |
| 5 | Right Turn |

Again, actual wiring may vary depending on the manufacturer of the semi-trailer or other considerations. When installed, the module 62 operates to flash the lights of a semi-trailer even though the trailer has been disconnected from the truck.

Those having ordinary skill in the relevant art will appreciate the advantages provided by the features of the present invention. For example, it is a feature of the present invention to provide emergency lights to a trailer that is not electrically connected to a tow vehicle. Another feature of the present invention to provide a temporary emergency lighting system for a trailer without modifying the existing trailer lighting system. It is a further feature of the present invention, in accordance with one aspect thereof, to provide a retrofit to an existing trailer lighting system to thereby provide emergency lighting for a trailer that is not electrically connected to a tow vehicle.

In the foregoing Detailed Description, various features of the present invention are grouped together in a single embodiment for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description of the Invention by this reference, with each claim standing on its own as a separate embodiment of the present invention.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus for activating lights on a trailer, said apparatus comprising:

a battery for supplying power to the trailer lights;

a first break-away switch device for controlling power to the trailer lights; and a second manually-operated switch device for controlling power to the trailer lights;

wherein said first break-away switch device and said second manually-operated switch device are electrically connected in parallel to the trailer lights;

wherein said first break-away switch device turns power ON to said trailer lights if the trailer becomes accidently uncoupled from a tow vehicle; and wherein said second manually-operated switch device turns power ON to said trailer lights in response to human input.

2. The apparatus of claim 1 further comprising an intermittent flasher device operable to flash or blink the trailer lights when said first break-away switch device or said second manually-operated switch device is ON, wherein said first break-away switch device and said second manually-operated switch device are electrically connected in parallel to the intermittent flasher device.

3. The apparatus of claim 2 wherein said intermittent flasher device and said trailer lights are connected in series.

4. The apparatus of claim 3 further comprising a one-way diode interposed between said first break-away switch device and said intermittent flasher device.

5. The apparatus claim 4, wherein the trailer further comprises a braking system, said first break-away switch device being further operable to engage said braking system if the trailer becomes accidently uncoupled from the tow vehicle.

6. The apparatus of claim 5 further comprising:

a control lever for actuating the first break-away switch device;

a lanyard having a first end and a second end, said first end of the lanyard being coupled to the control lever and the second end of the lanyard being coupled to an anchor point on the tow vehicle such that if the trailer becomes uncoupled from the tow vehicle, said lanyard displaces the control lever to thereby activate said first break-away switch device.

7. The apparatus of claim 6, wherein said apparatus is an aftermarket kit.

8. In a trailer having a trailer lighting system and an emergency brake system, said emergency brake system comprising brakes and a break-away switch for activating the brakes if the trailer is accidently uncoupled from a tow vehicle, the improvement which comprises electrically connecting the break-away switch and the trailer lighting system to activate one or more lights of the trailer lighting system if the trailer is accidently uncoupled from the tow vehicle, the improvement further comprising a one-way diode interposed between said break-away switch and said trailer lighting systems, and further comprising the improvement of inserting a manually operated switch into the trailer lighting system such that the trailer lighting system may be toggled ON and OFF by a user, wherein said manually operated switch and said break-away switch are electrically connected in parallel to the trailing lighting system.

9. In a trailer according to claim 8 wherein the improvement comprises inserting an intermittent flasher into the trailer lighting system.

10. In a trailer according to claim 8, wherein the trailer lighting system comprises tail lights, and the intermittent flasher is positioned in the trailer lighting system as to flash or blink the tail lights.

11. In a trailer according to claim 10, wherein the trailer lighting system further comprises tow marker lights, and the intermittent flasher is positioned in the trailer lighting system as to flash or blink the tow marker lights.

12. In a trailer having a trailer lighting system, the improvement which comprises adding a break-away switch to the trailer lighting system, the break-away switch operable to turn ON the trailer lighting system if the trailer is accidently uncoupled from the tow vehicle, the improvement further comprising a one-way diode interposed between said break-away switch and said trailer lighting system, and the improvement further comprising inserting a manually operated switch into the trailer lighting system such that the trailer lighting system may be toggled ON and OFF by a user independent of the break-away switch, wherein said manually operated switch and said break-away switch are connected in parallel to said trailer lighting system.

13. In a trailer according to claim 12 where the improvement further comprises adding a battery to the trailer lighting system.

14. In a trailer according to claim 12 wherein the improvement comprises inserting an intermittent flasher into the trailer lighting system.

15. In a trailer according to claim 12 wherein the trailer lighting system comprises tail lights, and the intermittent flasher is positioned in the trailer lighting system as to flash or blink the tail lights.

16. In a trailer according to claim 12, wherein the trailer lighting system further comprises tow marker lights, and the intermittent flasher is positioned in the trailer lighting system as to flash or blink the tow marker lights.

\* \* \* \* \*